United States Patent [19]

Defrancq

[11] Patent Number: 5,092,409
[45] Date of Patent: Mar. 3, 1992

[54] COUPLING AND LIFTING SYSTEM FOR AN IMPLEMENT, IN PARTICULAR AN AGRICULTURAL IMPLEMENT, THAT CAN BE MOUNTED ON THE FRONT OF A TRACTOR

[76] Inventor: Hubert Defrancq, 6 rue du Moulin, 51140 Jonchery-Sur-Vesle, France

[21] Appl. No.: 552,188

[22] Filed: Jul. 13, 1990

[30] Foreign Application Priority Data

Jul. 13, 1989 [FR] France .................. 89 09517

[51] Int. Cl.⁵ .................. E02F 3/76; A01B 63/111; A01B 59/048
[52] U.S. Cl. .................. 172/4.5; 172/448; 172/826; 172/47; 172/273; 172/239; 91/363 R; 91/530; 91/534
[58] Field of Search ............... 172/459, 449, 439, 443, 172/448, 445.2, 272, 273, 239, 297, 298, 309, 47, 824, 826, 810, 2, 4–4.5; 56/14.9, 16.2; 37/231, 234, 235, 236; 91/363 R, 530, 534

[56] References Cited

U.S. PATENT DOCUMENTS

| | | | |
|---|---|---|---|
| 2,617,660 | 11/1952 | Hadlock | 172/439 |
| 3,357,720 | 12/1967 | Kulhavy et al. | |
| 3,427,046 | 2/1969 | Sommer et al. | 172/272 |
| 3,432,184 | 3/1969 | Tweedy | 172/272 |
| 3,961,670 | 6/1976 | Rivinius | 91/530 |
| 4,019,588 | 4/1977 | Casey | 172/824 |
| 4,037,671 | 7/1977 | Kimber et al. | 91/534 |
| 4,120,364 | 10/1978 | Wooldridge | 172/2 |
| 4,125,271 | 11/1978 | Wilboltt et al. | 172/824 |
| 4,132,272 | 1/1979 | Holloway et al. | 172/2 |
| 4,139,066 | 2/1979 | Goodney et al. | 172/826 |
| 4,149,736 | 4/1979 | Von Allwörden | 172/450 |
| 4,337,959 | 7/1982 | Bettin et al. | 172/2 |
| 4,346,763 | 8/1982 | Swanson et al. | 172/2 |
| 4,354,688 | 10/1982 | Swanson | 172/2 |
| 4,415,175 | 11/1983 | Kainer . | |
| 4,535,847 | 8/1985 | Hasegawa et al. | 172/2 |
| 4,553,605 | 11/1985 | Katayama et al. | 172/2 |
| 4,790,557 | 12/1988 | Klingler | 172/450 |
| 4,825,956 | 5/1989 | Kanato et al. | 172/2 |
| 4,907,493 | 3/1990 | Bellanger et al. | 91/361 |
| 4,909,331 | 3/1990 | Defranco | 172/2 |
| 4,930,801 | 6/1990 | Gillund | 172/449 |
| 4,934,463 | 6/1990 | Ishida et al. | 172/4.5 |

FOREIGN PATENT DOCUMENTS

| | | |
|---|---|---|
| 2615255 | 4/1976 | Fed. Rep. of Germany . |
| 3218385 | 5/1982 | Fed. Rep. of Germany . |
| 2379242 | 2/1977 | France . |
| 2562752 | 4/1984 | France . |
| 1422134 | 9/1972 | United Kingdom . |

OTHER PUBLICATIONS

Bosch Hydraulics, Theory and Applications, 1984, p. 238.

Primary Examiner—Randolph A. Reese
Assistant Examiner—Spencer Warnick
Attorney, Agent, or Firm—Cushman, Darby & Cushman

[57] ABSTRACT

A system includes two lower articulated longitudinal arms (6, 7) provided on their front ends with two bottom hitching points (8, 9), and an upper arm (10) in the middle, for hitching an implement at a third point; valves for controlling the rise and descent of the two lower arms and of the upper arm are provided, and the implement (3) is equipped with hitching members (11) corresponding to the three point hitch of a tractor; a rigid intermediate support frame (12) is provided for connection between the implement and the arms (6, 7, 10); the frame includes two bottom lateral points (13, 14) and one top middle point (15) for hitching the implement, and two lateral top points (16, 17) intened to be connected to the third top hitching point (10) of the tractor by connection jacks of variable length; the two lower arms (6, 7) are independent and can assume different inclinations, and the two lower lateral portions (22, 23) of the frame (12) are hitched to the two bottom points (8, 9), the assembly being such that the implement (3) and the frame (12) can oscillate about a virtual longitudinal axis (B).

10 Claims, 2 Drawing Sheets

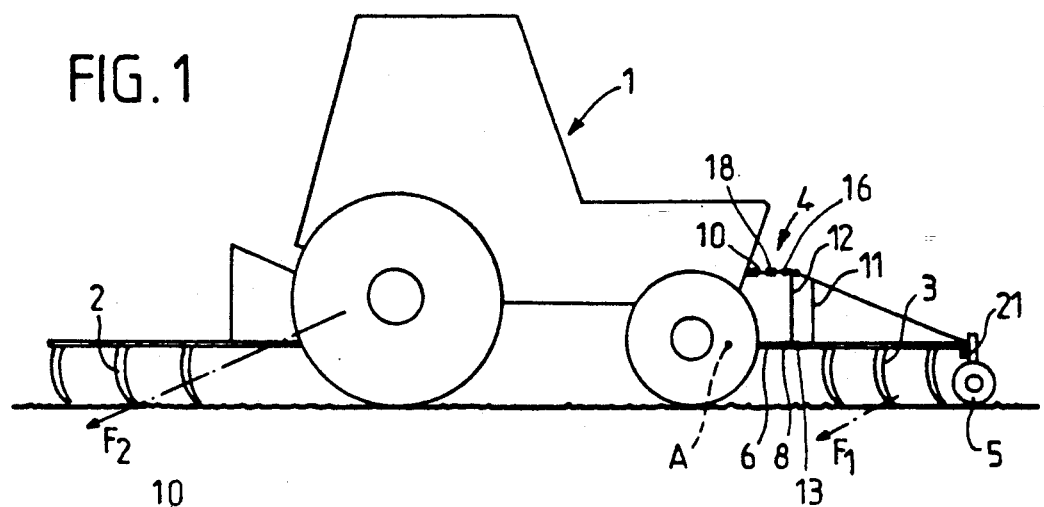
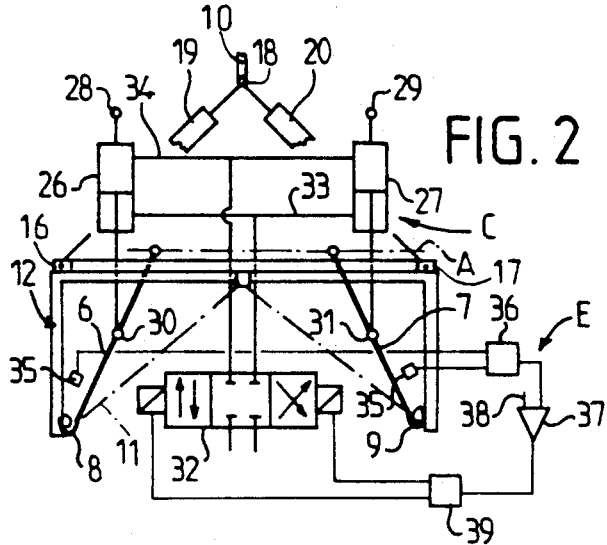
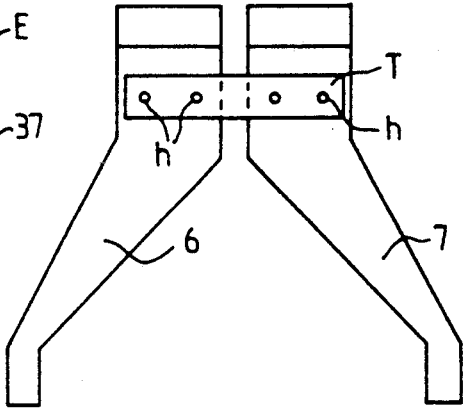
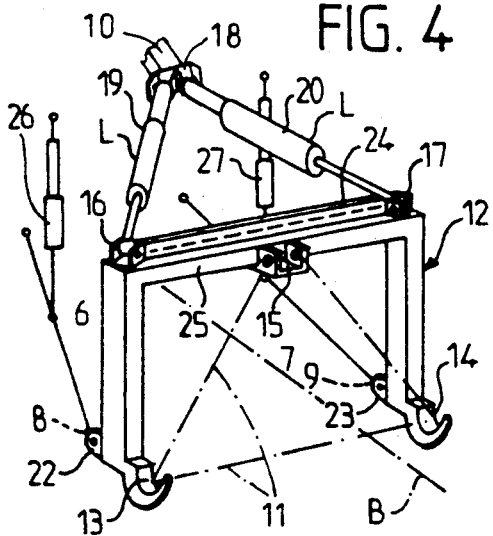
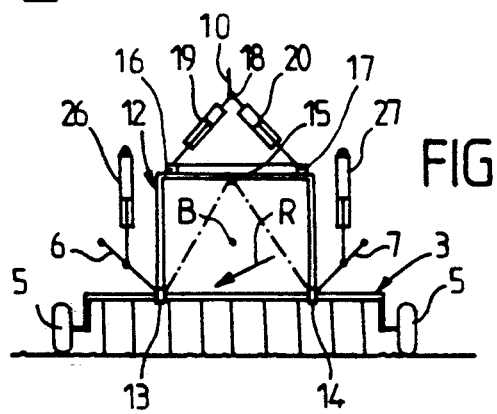

COUPLING AND LIFTING SYSTEM FOR AN IMPLEMENT, IN PARTICULAR AN AGRICULTURAL IMPLEMENT, THAT CAN BE MOUNTED ON THE FRONT OF A TRACTOR

FIELD OF THE INVENTION

The invention relates to a coupling and lifting system for an implement, in particular an agricultural implement, that is arranged to be mounted on the front of a tractor so as to be pushed and that is provided with at least one gauge wheel.

BACKGROUND OF THE INVENTION

The coupling and lifting system provided by the invention is of the type that includes two lower longitudinal arms articulated in such a manner as to be capable of rising or descending and provided on their front ends with hitching means comprising two bottom hitching points, and one upper arm in the middle, also articulated, for hitching the implement at a third point. Means for controlling the rise and descent of the two lower arms and of the upper arm are provided, and the rear portion of the implement is provided with hitching means corresponding to the three points of the tractor. A rigid intermediate support frame is also provided for connection between the implement and the arm and includes two lateral bottom points and one middle top point for hitching the implement, as well as two lateral top points equidistant from the middle top point that are intended to be connected to the third top hitching point of the tractor by connecting means of variable length.

French Patent 2 562 752 describes a coupling and lifting system of this type that allows the implement to follow transverse contours by rotation about a longitudinal axis that is parallel to the direction of forward travel of the tractor and is centered on the coupling system. Furthermore, mounting the upper portion with two telescoping connections makes it possible, when the implement is in use and is resting on its gauge wheel or wheels, to obtain a rotation of the implement about a lower bar connected to two lateral lower coupling hooks, which also enables the implement to follow longitudinal contours.

The existence of two upper telescoping bars, which lock in an elongation position by the influence of the weight of the implement in the raised position, when the gauge wheels are clear of the ground, makes it possible to assure the stability of the implement while it is being raised and to avoid an untimely rotation that could make the implement dig into the ground while it is being raised.

Replacing the upper telescoping bars with hydraulic jacks, the function of which is controlled by load pickups associated with the gauge wheels, makes it possible to assure a transfer of weight to the tractor while continuing to follow the longitudinal and transverse contours perfectly.

This kind of coupling and lifting system functions perfectly, but its cost limits its development. Furthermore the presence of a longitudinal bearing in the lower middle portion of the support frame virtually prevents the usage of a power take-off to drive certain implements, since there is no possible passageway for a transmission shaft.

OBJECT AND SUMMARY OF THE INVENTION

The primary object of the invention is to furnish a coupling and lifting system of the type defined above that no longer has the disadvantages of the prior art described above, or at least has them to a lesser extent. In particular, the coupling and lifting system should have a lower cost and should enable the usage of a power take-off to drive the implements in front of the tractor, while maintaining the capacity for following longitudinal transverse contours.

According to the invention, a coupling and lifting system for an implement, in particular an agricultural implement, of the type defined above is characterized in that the lower arms of the lifting system are independent from one another and can assume different inclinations, and that the two lower lateral portions of the intermediate support frame are hitched to the two bottom hitching points provided respectively on the front ends of the lower arms, the complete apparatus being such that the implement and the intermediate support frame can oscillate about a virtual longitudinal axis as a consequence of possible independent movements of the lower arm.

Such a system is particularly simple and has a relatively low production price.

Advantageously, the intermediate support frame is open in its lower portion, in particular to permit the passage of a transmission shaft between a power take-off of the tractor and an implement; the support frame may have the form of an inverted U.

Advantageously, the two top lateral points of the frame are provided on an independent bar arranged to be affixed, in particular by a screw-bolt connection or by welding, to the upper crossbar of a support frame not equipped with such lateral points.

Generally, each lower longitudinal arm is controlled by a hydraulic jack; the jacks of the two lower longitudinal arms may be supplied in parallel with liquid under pressure.

Connection means may be provided on each lower longitudinal arm, enabling the establishment of a rigid connection with the other longitudinal arm, in particular to prevent any possibility of oscillation about a virtual longitudinal axis upon use of implements in which the load is significantly off-center.

The connection means for each arm may comprise a bore, in particular including two sets of holes, the connection between the two arms being assured by at least one rigidifying bar.

It may be combined with an electrohydraulic position control apparatus; in this case, the system advantageously includes pickups to detect the position of each lower longitudinal arm and means for finding a mean value based on values furnished by the pickups, comparison means being provided for comparing this mean value with a reference value, and control means also being provided to keep the mean value substantially equal to the reference value.

In the case where each lower longitudinal arm is controlled by a hydraulic jack, the two jacks being supplied in parallel from a single source, each jack may include a check valve or the like, in its supply conduit beginning at a distributor valve common to the two jacks, to isolate the other jack, and another supply route is provided to supply each hoisting jack simultaneously with an associated upper jack, connecting the third upper hitching point the tractor to the corresponding upper lateral point of the intermediate support frame, each check valve being pilot-controlled to enable lowering of the system and implement.

A connection valve may be provided between the supply conduits of the hoisting jacks in order to assure the simultaneous function of these jacks without necessitating the removal of the check valves.

Advantageously, the system may include a solenoid valve mounted in a connecting conduit between the jacks; this solenoid valve is controlled, in particular via relays, when the supply distributor valve of the jacks is excited, and then shifts into a working position; the solenoid valve is arranged to assure the isolation of the chambers of the jacks when it is closed, while by opening, it enables remote-controlled coupling.

The invention, aside from the arrangements described above, also comprises a certain number of other arrangements which will be described in further detail below, in terms of particular embodiments described by way of example, with reference to the accompanying drawings, but these are in no way to be considered limiting.

BRIEF DESCRIPTION OF THE DRAWINGS

FIG. 1 is a schematic side view of a tractor equipped with an implement on the front and the back;

FIG. 2 is a schematic front view of a coupling and lifting system on the front of a tractor, according to the invention;

FIG. 3 is a simplified view showing the two lower longitudinal arms of the coupling system and detachable connecting means between these arms;

FIG. 4 is a perspective view of the coupling system;

FIG. 7 is a front view of the coupling system, showing the resultant of the forces that can act upon the system when the implement is in use.

DESCRIPTION OF THE PREFERRED EMBODIMENTS

Figure 5:
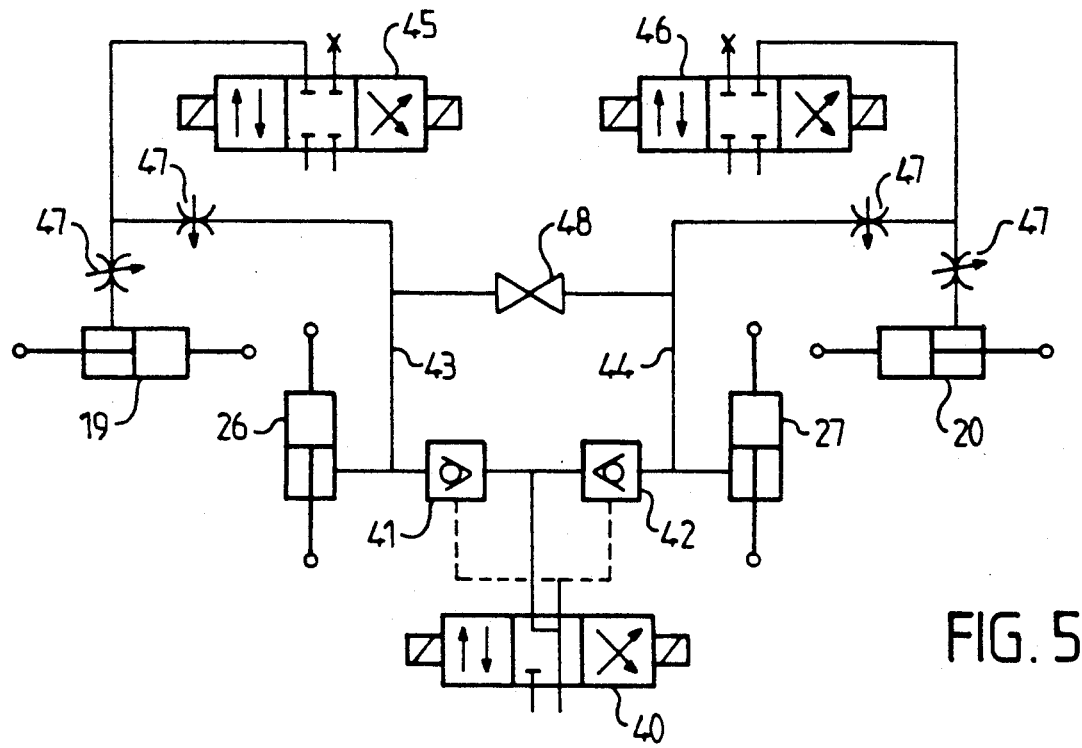
FIG. 5 is a hydraulic diagram of the coupling system.

Turning to the drawings, in particular FIG. 1, a tractor 1 is schematically shown, equipped with a pulled implement 2 on the back and a pushed implement 3 on the front. A system 4 for coupling and lifting the implement 3 is mounted on the front of the tractor. A similar coupling system may be provided at the back for the implement 2.

In the case of the pushed implement 3, the resultant F1 of the forces that act upon the implement when it is in use has a tendency to cause the implement to sink into the ground and become wedge in there, while in the case of the rear implement 2, the resultant F2 of the forces has a tendency to pull the implement 2 clear of the ground.

Under these conditions, one or more gauge wheels such as the wheel 5 are provided in front of the implement 3, to permit monitoring the working depth of the implement.

The coupling and lifting system 4 includes two lower longitudinal arms 6, 7 articulated on the front of the tractor 1, along a transverse axis A, in such a way that they can rise or descend. At their front ends, these arms 6, 7 are provided with conventional hitching means 8, 9, comprising two bottom hitching points.

A middle upper arm 10, also articulated at the front of the tractor along a transverse axis, is provided for hitching the implement 3 at a third point.

Means C for controlling the rise and descent of the two lower arms 6, 7 and of the upper arm 10 are provided, while in its rear portion the implement 3 is equipped with hitching means 11 that correspond to the three points of the tractor.

A rigid intermediate support frame 12 is provided for connection between the implement 3 and the coupling system 4. This frame 2 includes two bottom lateral points 13, 14 and a middle hitching point 15 at the top for the implement 3. These hitching points are conventionally embodied by hitches and a locking device, or fork joints, or any equivalent means.

The frame 12 also includes two top lateral hitching points 16, 17, formed in particular by fork joints, equidistant from the middle top point 15 and intended to be connected by connection means L of variable length to the third top hitching point of the tractor provided at the end of the upper arm 10.

The connection means L may comprise sliding telescoping bars, which when the implement 3 is in use and is resting on the gauge wheel or wheels 5 makes it possible to obtain a rotation of of the implement and frame about a transverse axis that passes through the bottom hitching points; this makes it possible to follow longitudinal contours when the movement of the two top lateral points is simultaneous, and to follow transverse contours with an alternating movement of the two top lateral points. These connection means L are arranged in a V; the ends of the arms of the V correspond to the top lateral points 16 and 17 of the frame, while the apex of the V corresponds to a double hitching fork joint 18 connected to the third top point 10 of the tractor. In the case intended, where the means L are formed by telescoping bars, these bars lock in a position of maximum elongation at the time of the raising, under the influence of the weight of the implement, and when the gauge wheels 5 are clear of the ground, the bars disposed in a V assure the stability of the raised implement.

In the exemplary embodiment of FIGS. 2 and 4, the connection means L are formed by two upper hydraulic jacks 19, 20 disposed in a V between the upper lateral points 16, 17 of the frame 12 and the double fork joint 18. The functioning of the jacks 19, 20 is controlled by weight pickups such as 21, which are associated with the gauge wheels 5 to enable a transfer of weight to the tractor 1 while maintaining perfect following of the contours.

The two lower lateral portions 22, 23 (FIG. 4) of the intermediate support frame 12 are hitched to the two bottom hitching points 8, 9 of the arms 6 and 7. The hitching of these lower parts 22, 23 may be assured by providing means such as a shaft in the rear lower portion of the frame 12; these means are solidly attached to the frame and are capable of being received and locked in the hitching points 8 and 9.

In addition, the two lower arms 6, 7 may have relative motions and may assume different inclinations with respect to the horizontal plane.

Under these conditions, the rigid assembly formed by the implement 3 and the support frame 12 fixed at three points to the implement may oscillate about a virtual longitudinal axis B that is substantially horizontal and is equidistant from the pivot points of the arm 6 and 7. Upon such oscillation, one of the arms 6, 7 may descend while the other arm 7, 6 rises.

The support frame 12 is advantageously open in its lower portion, in particular, to permit the passage of a transmission shaft between a front power take-off of the tractor and the implement 3 including devices to be driven. In the exemplary embodiment of FIG. 4, the support frame 12 has the form of an inverted U, with the opening in the lower portion comprising the free space between the lower ends of the arms of the U.

The two upper lateral points 16, 17 of the frame may be provided on an independent bar 24 capable of being affixed, in particular by a screw-bolt connection or by welding, to the upper crossbar 25 of the frame 12. Thus an existing frame that lacks hitching points 16, 17 can be converted into a frame 12 according to the invention by affixing the bar 24 that is provided with hitching points 16 and 17.

Generally, the control means C include one hydraulic jack 26, 27 (see FIG. 2) for each longitudinal lower arm 6, 7. The cylinder of each of these jacks is articulated via a fork joint at a point 28, 29 provided in front of the supporting framework of the coupling system affixed to the tractor. The end of the rod of these jacks is articulated at a point 30, 31 of the arms 6, 7.

The two jacks 26, 27 are supplied in parallel with the aid of a three-way electrohydraulic distributor valve 32. The chambers of the jacks 26, 27 penetrated by the rod are connected by a conduit 33, while the other chambers located on the opposite end of the piston from the rod are connected via a conduit 34 as indicated in FIG. 2.

It will be understood that even if the distributor valve 32 is closed (the position shown in FIG. 2), the arms 6 and 7 can shift inversely by transfer of liquid under pressure from the chamber of one jack to the other.

To obtain lifting of the implement, liquid under pressure is sent via the distributor valve 32 to the chambers of the two jacks 26, 27 penetrated by the rod. If one of the arms 6, 7 is loaded to a lesser extent than the other, it will rise more rapidly than the other; when the jack corresponding to this arm has reached the end of its path, the other arm can complete its path, such that the two arms are then at the same level, in the upper position, at the end of the path.

In the case where the implement 3 generates a significantly off-center load between the arms 6 and 7, which threatens to cause one of the arms 6, 7 to drop all the way down and the other to rise all the way up, then connection means formed by a transverse bar T are provided, making it possible to effect a rigid connection between the two arms 6 and 7. In proximity with the portion pivotably attached to the tractor, each arm includes two transversely disposed holes h enabling fixation of the bar T, provided with similar holes, to the arms 6 and 7 with the aid of bolts.

This rigid connection makes it possible to prevent relative motion of the arms 6 and 7 for implements in which the load is significantly off-center; this is the case of a pushed plow, the weight of which in the working position is virtually supported on a single side. In that case, tracking of transverse contours is then prevented, but this is generally no hindrance because most of the time the off-center implements are relatively narrow and so for them the problem of tracking of transverse contours does not arise, or at least is not as serious as for a very wide implement.

The coupling system may be combined with an apparatus E (see FIG. 2) for electrohydraulic position control.

The system then includes pickups 35 to detect the position of each arm 6, 7 and to furnish information X6, X7 representing this position at their output.

The outputs of these pickups 35 are connected to an electronic circuit 36 arranged to establish a weighted value, for example the mean value $Xm = (X6 + X7)/2$.

This mean value, furnished at the output of the circuit 36, is sent to one input of a comparator circuit 37; another input 38 of this circuit receives a comparison reference signal corresponding to a value Xs.

The output of the comparator 37 furnishes an error signal, which after amplification in an amplifier circuit 39 controls the electric distributor valve 32 in the appropriate direction in order to keep the mean value Xm equal to the reference value Xs.

Turning to FIG. 5, a hydraulic diagram can be seen for control of the raising jacks 26, 27 and the two jacks 19, 20 of the third top point, making it possible to obtain satisfactory function even in the particular case described with reference to FIG. 7.

In FIG. 7, the implement is shown schematically in a front view while in use.

The virtual axis of rotation B of the implement is represented by its path in the plane of FIG. 7.

It may happen that the forces applied to the implement 3 in use, under certain conditions, will have a resultant R that passes below the virtual axis B of rotation at the moment of the action of retraction of the associated jack 20. Under these conditions, if it is assumed that the gauge wheel 5b associated with the raising jack 27 and with the jack 20 of the third point is subjected to excess weight and has a tendency to sink, then the jack 20 will be controlled in the direction that shortens it, in such a way as to raise the implement 3 on the side of the wheel 5b. Because the resultant R passes below the axis B, the implement 3 will have a tendency to rotate clockwise, in the view of FIG. 7, about the axis B, that is, the wheel 5b will remain sunk in the ground. Because of the existing connection between the jacks 26 and 27 as shown in FIG. 2, this tendency of sinking of the wheel 5b and lowering of the arm 7 will encounter no resistance on the part of the jack 27, since this jack can become longer by forcing back the oil from its chamber penetrated by the rod into the corresponding chamber of the jack 26. In other words, the implement will rotate in the direction opposite the direction desired, and the gauge wheel 5b will not be relieved.

To avoid this disadvantage, the hydraulic control diagram of FIG. 5 is used.

The two jacks 26, 27 for controlling the arms 6 and 7 are supplied in parallel, in a unidirectional manner, in their chamber penetrated by the rod by a distributor valve 40, from a single source of liquid under pressure.

Each jack includes a respective check valve 41, 42 on its supply conduit, pilot-controlled upon opening to allow the descent of the implement. The valves 41, 42 allow liquid originating in the distributor valve 40 to flow in the direction of each jack, and they prevent the flow of liquid in the opposite direction. The work chambers of the jacks 26 and 27 are thus isolated.

Another supply route 43, 44, respectively, is provided for each jack 26, 27 and allows sending liquid under pressure directly into the associated jack, without passing through the corresponding check valve.

This route 43, 44 is connected in parallel to the distributor valve 45, 46 that controls the upper jack of the corresponding third point 19, 20. Adjustable flow rate limiters 47 are provided for the various conduits, to adjust the flow rates.

A connection valve 48 that is normally closed is mounted on a conduit that connects the routes 43, 44. This isolates the chambers of the jacks 26, 27.

With this kind of hydraulic circuit, when an upper jack, for example the jack 20, receives liquid under pressure controlling the return of its rod in order to raise the associated gauge wheel, the corresponding lifting jack 27 likewise receives liquid under pressure, which brings about an action of the jack 27 tending to raise the gauge wheel, in other words, an action in the same direction as that of the jack 20.

Under these conditions, even if the resultant R passes below the virtual axis B, the work with the isolated chambers is satisfactory.

The connection valve 48 may be opened to assure the simultaneous parallel supply to the two lifting jacks 26, 27, without having to remove the check valves 41, 42, in the case of normal rotation of the implement with sliding third points, or if the upper jacks 19, 20 are used, in the case where the resultant R passes above the virtual axis, including the effect of the aforementioned jacks 19, 20.

The bidirectional function of the jacks 26, 27 may be provided, however, to facilitate coupling of the implement 3.

Figure 6:
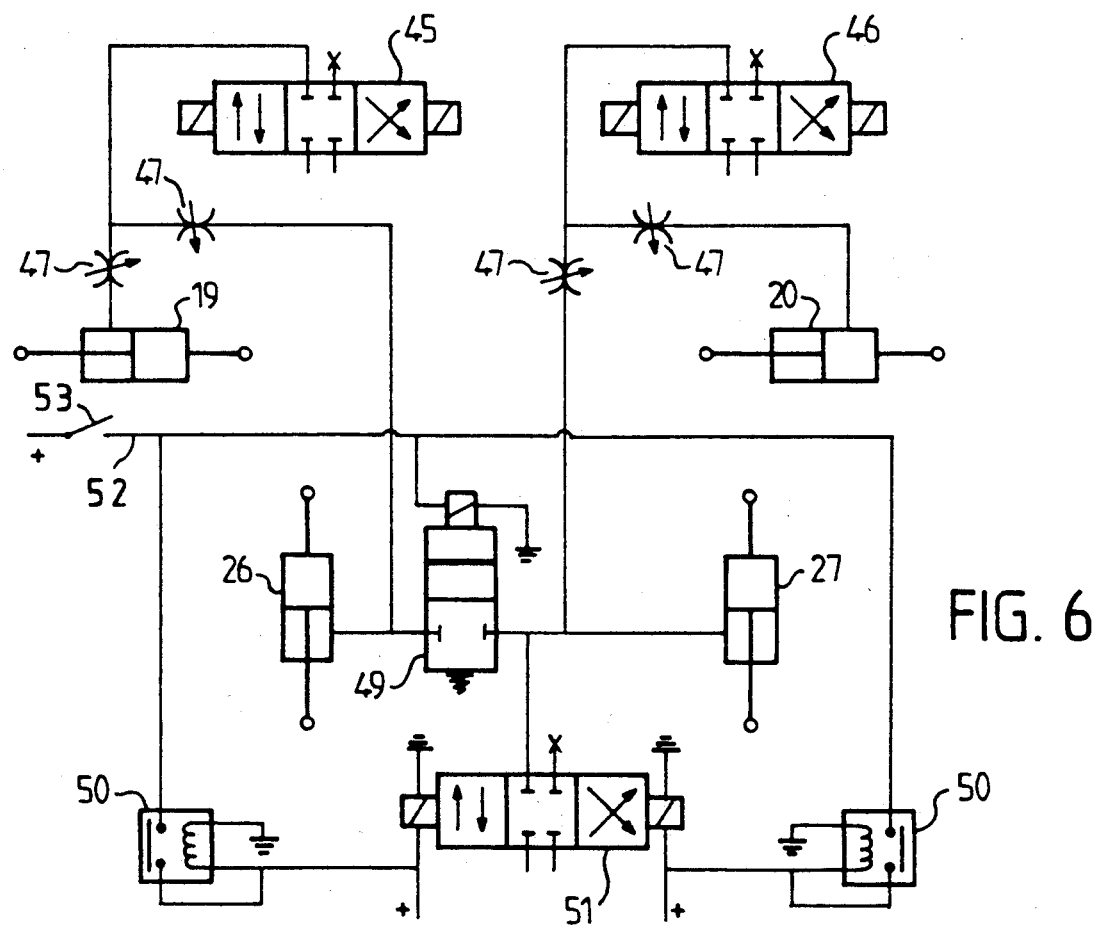
FIG. 6 shows a variant of the hydraulic diagram of FIG. 5; and, finally.

FIG. 6 shows a variant of the hydraulic diagram of FIG. 5. A solenoid valve 49 that can assume two positions (open and closed) replaces the check valves 41, 42 and the valve 48 of FIG. 5, on the connection conduit between the jacks 26, 27.

The solenoid valve 49, when closed, isolates the chambers of the two jacks 26, 27 from each other so that the system operates like the systems shown in FIG. 5 which is provided with the check valves 41 and 42. When the solenoid valve 49 is open, the system of FIG. 6 operates like the system of FIG. 5 with the valve 48 open, that is, the chambers of the two jacks 26 and 27 are hydraulically coupled.

The solenoid 49 is controlled via relays 50, possibly of the time-delay type, when the distributor valve 51 supplying the jacks 26, 27 is excited and shifts into a working position.

Thus when the distributor valve 51 of the type with a closed center is in the position of repose shown in FIG. 6, the solenoid valve 49 is closed, and the chambers of the jacks 26, 27 are isolated.

When one of the control coils of the distributor valve 5 is excited, the relay 50 connected in parallel on the coil is also excited, and a work contact with this relay assures the electrical supply to the control coil of the solenoid valve 49, which shifts into the open position.

A control line 52 belonging to the coil of the solenoid valve 49 may be provided, to enable pilot control of this solenoid valve 49 independently of the distributor valves 51. In particular, a contactor 53 controlled by the tractor driver from the cab may be provided to assure the permanent supply of electric power to this solenoid valve 49, without also acting upon the distributor valve 51, since the work contacts of the relays 50 are open. Under these conditions, the solenoid valve 49 can be kept in the open position, assuring connection between the jacks 26, 27, when the driver ascertains that the resultant R of the forces is passing above the virtual axis of rotation B.

Other types of control of the solenoid valve 49, for example automatic control, as a function of various parameters, may be provided from the line 52.

What is claimed is:

1. A coupling and lifting system for an agricultural implement of the type to be attached to a three point hitch on the front of a tractor to be pushed thereby and comprising a pair of horizontally spaced arms each having one end articulated to a lower hitch point of the three ponit hitch to allow said arms to rise and descend, each said arm having an arm opposite end, each said arm opposite end having an arm hitching point, said system including an upper arm having one end and an opposite end, said one end of said upper arm being articulated to an upper hitch point of the three point hitch, said upper arm being located vertically above and between said pair of arms, said opposite end of said upper arm having an upper arm hitching point thereon, said system further including means for controlling the rise and descent of said pair of arms and said upper arm, a rigid intermediate support frame means for connection between the implement and said arms, said support frame means including two lateral bottom connection members and one middle top mounting member for hitching the implement to said support frame means, said support frame means having two lateral top connection sites spaced generally equidistant from said middle top mounting member for connection to said upper arm hitching point by arm members of variable length, said pair of arms of said system being movable independently of one another to assume different inclinations relative to a horizontal plane, said two lateral bottom connection members of said support frame means being hitched to the arm hitching points of said pair of arms, said means for controlling the rise and descent of said pair of arms comprising an hydraulic jack for each of said arms of said pair of arms, each jack having one end connected to an arm of said pair of arms and an opposite end connected to said tractor, each said jack having a chamber with the chamber of one of said jacks being connected to the chamber of the other jack by a conduit and each said chamber being supplied in parallel with fluid under pressure through conenction valve means to control flow through said conduit, said connection valve means being movable between an open and a closed position so that, with said connection valve means in said closed position, fluid may pass through said conduit from one chamber to the other chamber to allow said pair of arms to move inversely relative to each other whereby the implement and support frame means can oscillate about a virtual longitudinal axis which is equidistant from said hitching points of said pair of arms 2. The system as defined by claim 1, characterized in that the intermediate support frame means (12) has a lower portion that is open to permit the passage of a transmission shaft between a power take-off of the tractor and the implement.

3. The system as defined in calim 2, characterized in that the support frame means (12) has the form of an inverted U.

4. The system as defined by claim 1 or 2, characterized in that coupling means are provided establishing a rigid connection between said pair of arms to prevent any possibility of oscillation about a virtual longitudinal axis upon use of implements in which a load is significantly off-center.

5. The system as defined by claim 4, characterized in that the coupling means an each arm comprise two sets of holes and at least one rigidifying bar (T) having bolts therethrough and received in said respective hole.

6. The system as defined by claim 1 or 2, including an apparatus (E) for electrohydraulic position control, said coupling and lifting system including sensors (35) to detect the position of each of said pair of arms (6, 7) and means (36) for finding a mean value (Xm) based on values (X6, X7) furnished by the sensors (35), comparison means (37) being provided for comparing said mean value with a reference value (Xs), and control means (39) also being provided to keep the mean value (Xm) substantially equal to the reference value (Xs).

7. The system as claimed in claim 1 wherein an hydraulic system is provided for said jacks and includes supply conduit means extending from a distributor valve common to said two jacks, wherien said connection valve means is a solenoid valve operated through a relay which is actuated in response to actuation of said distributor valve to move said solenoid valve from the closed to the open position.

8. The system as defined by claim 7, wherein a control switch (52) for the solenoid valve (49) is provided to permit pilot control of said solenoid valve (49) independently of the distributor valve (51).

9. The system as claimed in claim 1 wherein an hydraulic system is provided for each jack and includes a supply conduit connected to a distributor valve common to each jack and further including a check valve to isolate one of the jacks, said hydraulic system further including upper jacks and another supply conduit to supply each jack simultaneously with an associated upper jack, each said upper jack connecting said upper arm hitching point to one of a corresponding one of the lateral top connection sites of the intermediate support frame means, each check valve being pilot-operated to enable lowering said system and the implement.

10. A coupling and lifting system for an agricultural implement of the type to be attached to a three point hitch on the front of a tractor to be pushed thereby and comprising a pair of horizontally spaced arms each having one end articulated to a lower hitch point of the three point hitch to allow said arms to rise and descend, each said arm having an arm opposite end, each said arm opposite end having an arm hitching point, said system including an upper arm having one end and an opposite end, said one end of said upper arm being articulated to an upper hitch point of the three point hitch, said upper arm being located vertically above and between said pair of arms, said opposite end of said upper arm having an upper arm hitching point thereon, said system further including means for controlling the rise and descent of said pair of arms and said upper arm, a rigid intermediate support frame means for connection between the implement and said arms, said support frame means including two lateral bottom connection members and one middle top mounting member for hitching the implement to said support frame means, said support frame means having two lateral top connection sites spaced generally equidistant from said middle top mounting member for connection to said upper arm hitching point by arm members of variable length, said pair of arms of said system being movable independently of one another to assume different inclinations relative to a horizontal plane, said two lateral bottom connection members of said support frame means being hitched to the arm hitching points of said pair of arms, said means for controlling the rise and descent of said pair of arms comprising an hydraulic jack for each of said arms of said pair of arms, each jack having one end connected to an arm of said pair of arms and an opposite end connected to said tractor, each said jack having a chamber with the chamber of one of said jacks being connected to the chamber of the other jack by a conduit and each said chamber being supplied in parallel with fluid under pressure through conenction valve means to control flow through said conduit, said connection valve means being movable between an open and a closed position so that, with said connection valve means in said closed position, fluid may pass through said conduit from one chamber to the other chamber to allow said pair of arms to move inversely relative to each other whereby the implement and support frame means can oscillate about a virtual longitudinal axis which is equidistant from said hitching points of said pair of arms, said intermediate support frame means having an upper crossbar and the lateral top connection sites of the intermediate support frame means being provided on an independent bar affixed to said upper crossbar of said intermediate support frame means.

* * * * *